H. A. HAYWARD.
AUTOMATIC CUT-OFF.
APPLICATION FILED APR. 29, 1913.

1,125,315.

Patented Jan. 19, 1915.

Witnesses:

Inventor
Harold A. Hayward
By his Attorney

UNITED STATES PATENT OFFICE.

HAROLD A. HAYWARD, OF NEW YORK, N. Y., ASSIGNOR TO CONNELLY IRON SPONGE & GOVERNOR COMPANY, OF NEW YORK, N. Y., A CORPORATION OF NEW JERSEY.

AUTOMATIC CUT-OFF.

1,125,315.   Specification of Letters Patent.   Patented Jan. 19, 1915.

Application filed April 29, 1913. Serial No. 764,297.

*To all whom it may concern:*

Be it known that I, HAROLD A. HAYWARD, a citizen of the United States, residing in New York, in the county and State of New York, have invented certain new and useful Improvements in Automatic Cut-Offs, of which the following is a full, clear, and exact description.

The present invention relates generally to improvements in automatic cut-offs for use in connection with the delivery of air, gas, water or other fluids from a source of supply to the point of service or consumption.

The object of the present invention is to provide a fitting embodying an automatic cut-off, which is adapted to be located at any suitable point in the fluid delivery system or piping, preferably between the supply pipe and the service pipe, whereby a sub-normal pressure or a cessation of pressure of the fluid being delivered will cause a valve to operate to prevent a backward or a return flow of the fluid from the service pipe to the supply pipe.

A further object of my invention is to provide an automatic cut-off for use, and to operate as heretofore explained, wherein the correlated parts of the cut-off and fitting will be of a structure, which will not in any way affect or modify the flow of fluid therethrough under normal conditions; the construction of my improved device being such as to permit of the fluid passing therethrough without lessening or decreasing its volume as has been necessary heretofore in devices of this character.

My invention further contemplates the provision of a device of the aforesaid character, which, in addition to possessing the advantages of an automatic cut-off, will also have the function of a safety appliance, in that upon the valve becoming operative, to prevent backward flow of the fluid, it will be automatically locked and may only be released by the application of manual means.

I shall now proceed to describe my invention with reference to the accompanying drawings and then point out with more particularity the essential elements of novelty thereof in the appended claims.

Figure 1:
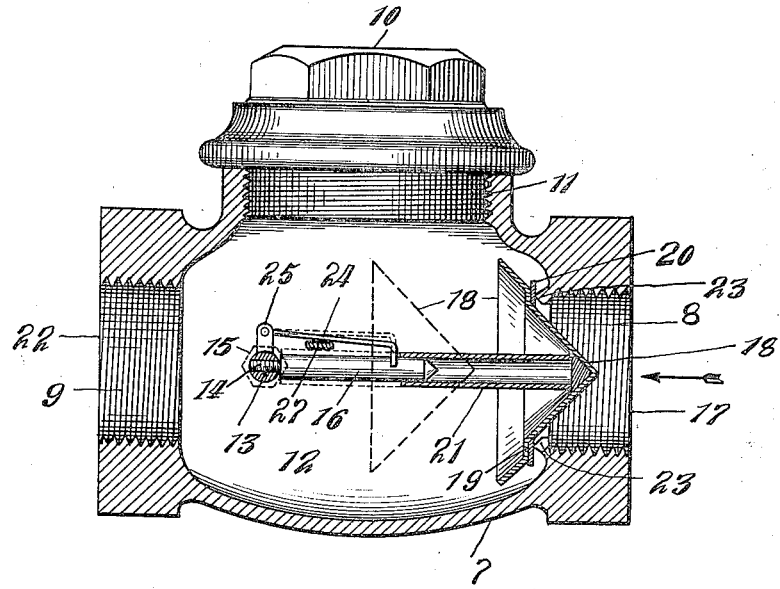
Figure 2:
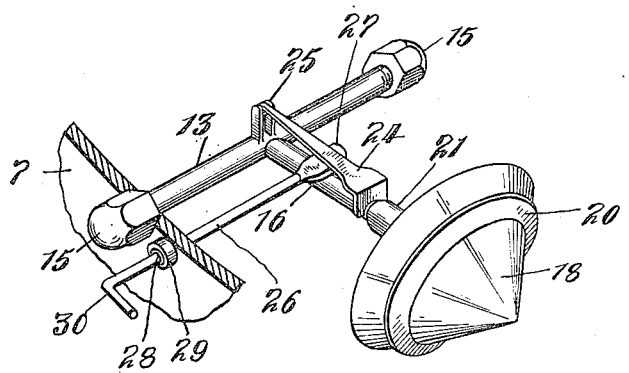

In the drawings: Figure 1 is a longitudinal section of my device showing the valve in its normally opened position and Fig. 2 is a view in perspective of the valve and means I employ for mounting the valve within the fitting.

Referring now to the drawings in detail, in which like characters of reference are employed to designate similar parts throughout the several views, 7 is the usual fitting or coupling which is suitably threaded at 8 and 9 to be attached to the supply and service pipes respectively (not shown) of a fluid system the fitting being provided with the customary cap 10 threaded thereinto at 11 to afford access to the interior thereof as and for purposes which will be hereinafter apparent. Rigidly mounted within and extending transversely of the chamber 12 formed in said fitting 7, I provide a rod 13, which I preferably secure in position within suitable apertures in the opposite sides of the wall of the chamber, the ends of the rod protruding beyond the outer wall of the fitting and being threaded to receive the securing nuts 15. Upon this rod 13, midway between its ends, I mount a second rod 16 which extends at right angles to the rod 13. This second rod 16 is preferably threaded into the rod 13, as shown at 14, to facilitate assembling and disassemblement of the parts. It will be observed that the rod 16 terminates at some distance from the inlet 17 of the fitting to provide for the operation of the valve 18 as hereinafter explained.

The valve 18, which I preferably employ in carrying my invention into effect, is conical in shape as shown, being provided with a shoulder 19 midway between its base line and apex, which forms a seat for the washer or packing ring 20. This valve 18 is mounted on the sleeve 21 which slides upon the rod 16 as will be apparent from Fig. 1 of the drawings.

It will be manifest from the embodiment of my invention herein illustrated and thus far described, that the fluid flowing from the supply pipe in the direction of the arrow, (see Fig. 1) will cause the valve to open until the end of the sleeve 21 abuts against the transverse rod 13, the fluid passing around the valve and flowing through the chamber and through the outlet 22. I have found in practice that it is desirable to so proportion the valve 18 with relation to the interior dimensions of the chamber 12 that the space between the valve and the wall of the chamber, when the former is in open position, is approximately one and one-half times that of the area of the inlet 17. By this means, the fluid entering the fitting through the inlet 17, is delivered without being decreased in volume and without variation in the pressure, the capacity of the space between the wall of the chamber and the valve compensating for any loss in volume owing to friction in passing about or around the valve. Under normal conditions, that is to say, normal pressure, the valve will be maintained in the position shown in dotted lines in Fig. 1, by the force of the pressure passing through the fitting, but, should the pressure of the fluid from the source of supply fall below the normal, or cease to flow, so that the pressure in the service pipe is greater than that in the supply pipe, the valve, under the influence of the back pressure from the service pipe, will move to the position shown in Fig. 1, resting upon the seat 23, in the form of an annular flange formed integral with the inlet 17, the washer or packing ring 20 abutting thereagainst and hermetically sealing the passage. As the valve 18 moves to closed position, it is locked against automatically opening by a latch 24 which is fulcrumed on the transverse rod 13 at 25, and which normally bears upon the surface of the sleeve when the valve is in open position as shown in dotted lines in Fig. 1. It is obvious that as the valve moves to closing position, the sleeve will slide freely under the latch 24 until the valve is seated, when the latch will drop into position abutting against the edge of the sleeve as shown in Fig. 1.

By this construction, it will be apparent that in addition to my invention embodying an automatic cut-off, it also includes safety means, which renders the automatic opening of the valve impossible, so that in case of accident or under circumstances which would act to close the valve, and cut off the flow of the fluid, the system of which my invention is a part cannot be put into operation until the valve is manually released by means of the rod 26, the flattened end of which 27, is adapted to engage with and raise the latch 24, upon the rod being rotated in its bearing 28 provided by a stuffing box 29, mounted in the side of the fitting 7, the end of the rod exterior of the fitting being bent to form the operating handle or lever 30. This arrangement insures the proper rectification of the trouble before the system can again be put into service. When the latch 24 has been raised, the valve 18 will, of course, move to open position under the influence of the pressure entering the fitting through the inlet 17.

While I have described my invention with reference to the specific structure illustrated herein, it is obvious that the same may be varied in minor details without departing from the spirit and scope of my invention.

Having thus described my invention what I claim as new herein and desire to secure by Letters Patent is:

1. An automatic cut-off for fluid systems comprising a fitting having an inlet and an outlet, and an enlarged central portion providing a chamber, a rod mounted transversely of said chamber, a second rod mounted on said transverse rod at right angles thereto, and a sleeve slidably mounted on said second rod and carrying a valve, said valve being actuated by the fluid passing through said fitting.

2. An automatic cut-off for fluid systems comprising a fitting having an inlet and an outlet, and an enlarged central portion providing a chamber, a rod mounted transversely of said chamber, a second rod mounted on said transverse rod at right angles thereto, a sleeve slidably mounted on said second rod and carrying a valve, said valve being actuated by the fluid passing through said fitting, and a manually releasable latch adapted to engage with said sleeve and automatically lock said valve in closed position.

In witness whereof I have hereunto set my hand in the presence of two subscribing witnesses this 25th day of April, 1913.

HAROLD A. HAYWARD.

Witnesses:
ELLA M. SCHACHT,
JOSEPH G. QUINN, Jr.